United States Patent [19]

DiSanto

[11] 4,174,308
[45] Nov. 13, 1979

[54] FORMING INSULATION FROM SCRAP RUBBER

[76] Inventor: Rocco J. DiSanto, 103 Read St., Portland, Me. 04103

[21] Appl. No.: 893,477

[22] Filed: Apr. 4, 1978

[51] Int. Cl.² ............................. C08J 9/08; C08J 9/14
[52] U.S. Cl. ....................................... 260/2.3; 521/84; 521/92
[58] Field of Search .......... 260/2.5 R, 2.5 HB, 2.5 L, 260/2.3, 710, 711; 521/84

Primary Examiner—Morton Foelak
Attorney, Agent, or Firm—Charles Hieken

[57] ABSTRACT

Scrap buffed rubber is mixed with a flour, water and yeast mixture, a deodorant, an antivermin agent and a flame retardant, and baked to form a cellular material suitable for thermal insulation.

8 Claims, No Drawings

FORMING INSULATION FROM SCRAP RUBBER

BACKGROUND OF THE INVENTION

The present invention relates in general to insulating and more particularly concerns novel methods and means for using waste rubber in a thermal insulation that is economical, flame retardant, water repellant, relatively easy to manufacture with relatively inexpensive materials and provides good insulating properties.

The recovery of waste rubber has long been an object of interest. For example, U.S. Pat. No. 40,497, dated Oct. 27, 1863, dealt with the problem of recovering and reusing waste rubber. Other patents such as U.S. Pat. No. 1,807,930, dated June 2, 1931, dealt with turning scrap rubber into new useful forms.

It is this latter field with which the present invention is concerned, namely, the use of scrap rubber as a base material for the creation of other material useful for various objects. In particular, the invention concerns a process for making from scrap rubber, a novel product suitable for use as a thermal insulation packing.

Discarded tires are a major source of litter. One approach for dealing with discarded tires involves shredding the tires and burying the shredded rubber. Typically wornout tires may be discarded in a dump where they attract rats and present a fire and pollution hazard. Burning rubber in dumps is difficult to extinguish and produces unpleasant fumes. Another approach involves discarding used tires in the ocean; however, this approach presents environmental problems.

The present invention is also concerned with another important problem. With declining sources of fossil fuels energy conservation is vital. Accordingly, governmental agencies have widely promoted improving the insulative properties of buildings. The response to this promotion has been increased demand for insulation with increased difficulties in meeting the demand and higher prices for insulation. Furthermore, the demand for insulation has been met in increasingly larger amounts with insulation that is inferior from the standpoint of one or more of fire retardant properties, antivermin properties and insulating properties.

Accordingly, it is an important object of this invention to help alleviate one or more of the problems enumerated above.

It is an object of this invention to produce useful thermal insulation material from scrap rubber in accordance with the preceding object.

It is another object of the invention to produce this material in accordance with one or more of the preceding objects with readily available materials.

It is still another object of the invention to achieve one or more of the preceding objects with a method that is simple and that uses readily available apparatus.

SUMMARY OF THE INVENTION

According to the invention, thermal insulating material is formed by mixing used rubber in particulate form with heat expansible material, and baking the mixture thereby created. The heat expansible material may be a mixture of flour or other suitable binder, yeast or other suitable leavening agent and water or other suitable liquid. Furthermore, there may be added to this mixture a flame retardant material, an antivermin agent, and a deodorizer.

The material formed according to the invention comprises used particulate rubber held in cellular form by a heat expansible binder. The heat expansible binder may comprise flour, and the product may further include a flame retardant, an antivermin agent, and a deodorizer.

Numerous other features, objects and advantages of the invention will become apparent from the following specification.

DETAILED DESCRIPTION OF PREFERRED EMBODIMENTS

The following examples illustrate the invention:

EXAMPLE A

In this example 5,275 grams of buffed rubber in particulate form from an old tire or tires or other source of waste rubber is mixed with 2,000 grams of flour, 5,000 grams of sodium tetraborate (such as that sold under the trademark BORAX), a fire retardant, and 75 grams of ammonium sulfate, and antivermin agent. This first mixture is warmed in an oven at 180° F. for five minutes.

Ten packages of dry yeast (140 grams) is added to 6 quarts of warm water and mixed in the water thoroughly. Then the yeast mixture is added to the first mixture and everything is mixed thoroughly. This mixture is then set in a warm place (about 90° F.) for about a half hour.

The mixture is then placed in flat pans such as bread pans, and baked in an oven at 425° F. for 30 minutes.

The baked mixture is then removed and cooled until it can be touched with the hand, about 15–20 minutes at room temperature. It is then cut into convenient strips about 3 inches wide and ground in, for example, a meat grinder. The resulting pellets may be separated by hand. The pellets are then cooked in a microwave oven for about 4 minutes or until slightly brittle.

One pint of odorless smoke-resistant liquid (such as Smoke Odor Concentrate available from the Odorite Co. of 495 Fore Street, Portland, Ma. 04111) is then added to a mixture of two gallons of warm, almost hot (90°) water, 4 more packages of yeast, and 6 cups of flour. The mixture is well mixed in a food mixer. To the solution thus formed is added about 5 lbs. of the pellets formed by the previous operation. The pellets remain in the solution for about 20 minutes to allow the solution to soak through the pellets. The pellets are then removed and placed in a sieve, which is shaken to drain excess liquid solution from the pellets.

The pellets are then put back in flat trays and baked in an oven at 425° F. for 15 minutes. After being removed from the oven and allowed to cool, the mass is cut into sections of any desired size. Cutting by hand is possible. The cut-up pieces are then placed in a tray and put in a microwave oven for about 5 minutes. They are then removed, cooled, and are ready for use.

EXAMPLE B

In this example the process for going from used rubber in particulate form to the desired finished product takes only about 10 minutes.

First a mixture of a cup of buffed rubber, a ¼ cup of sodium tetraborate, ½ ounce of yeast, and ¼ cup of flour is mixed well. Then ¼ cup of hot water is added and the mixture is stirred to a paste. The paste is put in trays into a microwave oven and cooked there for two minutes. The trays are removed, cooled for about a minute, and the baked mixture is turned over and baked for two minutes on the other side in the microwave oven.

After removal, the mixture is allowed to cool for about 2 minutes. It is then cut into the desired pieces and the pieces are baked in the microwave oven for 2 minutes, removed, and cooled.

For both the examples described above, the result will be chunks of a material which is rubber held in cellular form. While the principles of the invention are not fully understood, the mixture of flour, yeast and water may form a heat expansible material that expands during the baking process, and either may bind the buffed rubber together or may cause the buffed rubber to bind together.

A satisfactory form of used particulate rubber is that produced by buffing tire casings prior to retreading them with the used rubber being essentially in powder form. Other types of shredded used rubber may be used in practicing the invention.

In Example B ammonium sulfate or other suitable antivermin agent and/or deodorizer could be added to the mixture before cooking. In both examples, the yeast or other suitable leavening agent, such as baking powder, could be omitted; however, the leavening agent may contribute to forming a less dense material that may have better insulating properties per unit weight of material. Conventional flour may be used in practicing the invention. Since the product is not for human consumption, any form of flour, including that normally discarded by mills may be used in practicing the invention, further reducing the costs. Furthermore, since it is now common practice to pay for removing wornout tires, the cost of the raw material may be negative; that is to say, one practicing the patented invention may actually be paid for obtaining the raw material, further reducing the material costs.

The specific examples set forth are by way of example only and for illustrating the best mode now contemplated for practicing the invention. The specific proportions of materials set forth are not intended to be limiting. It is evident that the small-scale examples actually practiced described above may be used as the basis for practicing the invention on a significantly larger scale. Appendix A includes a sample of the novel product according to the invention.

The result is a lightweight cellular material suitable for thermal insulation packing. Having rubber as a principal ingredient, the material is long lasting and resistant to deterioration due to moisture. The addition of the flame retardant and the antivermin agent to the mixture adds the corresponding properties to the formed material. The deodorizer helps remove any undesirable odor from the material.

There has been described novel techniques for producing a useful product from scrap rubber. It is evident that those skilled in the art may now make numerous uses and modifications of and departures from the specific examples described herein without departing from the inventive concepts. Consequently, the invention is to be construed as embracing each and every novel feature and novel combination of features present in or possessed by the products and methods herein disclosed and limited solely by the spirit and scope of the appended claims.

What is claimed is:

1. A method of forming foamed thermal insulating material comprising mixing used scrap rubber in particulate form with a heat expansible conventional flour binder material and a mixture which is a levening agent such as yeast or baking powder with a liquid such as water and baking the mixture thereby created to form a foamed product.

2. The method of claim 1 in which said mixture comprises a flame retardant material.

3. The method of claim 1 in which said mixture comprises an antivermin agent.

4. The method of claim 3 in which said mixture comprises a deodorizer.

5. A method of forming thermal insulating material in accordance with claim 1 wherein said liquid is water and said mixture comprises yeast, a flame retardant, an antivermin agent and a deodorizer.

6. A thermal insulating material made in accordance with the method of claim 1 comprising said used rubber in particulate form held in cellular form by means including said heat expansible binder material.

7. The material of claim 6 in which said mixture further includes a deodorizer.

8. The material of claim 6 in which said mixture further includes an antivermin agent.

* * * * *